United States Patent
Yu et al.

(10) Patent No.: US 12,058,720 B2
(45) Date of Patent: Aug. 6, 2024

(54) METHODS OF IMPROVING THE ROBUSTNESS FOR DCI TRIGGERED BEAM UPDATE IN 5G NR

(71) Applicant: APPLE INC., Cupertino, CA (US)

(72) Inventors: Zhibin Yu, Unterhaching (DE); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 388 days.

(21) Appl. No.: 17/593,079

(22) PCT Filed: May 1, 2020

(86) PCT No.: PCT/US2020/031102
§ 371 (c)(1),
(2) Date: Sep. 8, 2021

(87) PCT Pub. No.: WO2020/223665
PCT Pub. Date: Nov. 5, 2020

(65) Prior Publication Data
US 2022/0191878 A1     Jun. 16, 2022

Related U.S. Application Data

(60) Provisional application No. 62/842,006, filed on May 2, 2019.

(51) Int. Cl.
*H04W 4/00* (2018.01)
*H04L 5/00* (2006.01)
(Continued)

(52) U.S. Cl.
CPC ......... *H04W 72/542* (2023.01); *H04L 5/0051* (2013.01); *H04W 72/046* (2013.01); *H04W 72/23* (2023.01)

(58) Field of Classification Search
CPC . H04W 72/542; H04W 72/046; H04W 72/23; H04L 5/0051; H04L 5/0023;
(Continued)

(56) References Cited

U.S. PATENT DOCUMENTS

2015/0358914 A1* 12/2015 Song .................. H04L 5/14
370/280
2016/0285716 A1* 9/2016 Pelletier ............ H04W 74/0833
(Continued)

FOREIGN PATENT DOCUMENTS

CN      108199819 A    6/2018
WO    2018143654 A1    8/2018
(Continued)

OTHER PUBLICATIONS

PCT/US2020/031102, International Search Report and Written Opinion, Aug. 17, 2020, 9 pages.

*Primary Examiner* — Stephen M D Agosta
(74) *Attorney, Agent, or Firm* — Dorsey & Whitney LLP

(57) ABSTRACT

Systems and methods for improving the robustness of a DCI triggered beam update in 5G NR are disclosed herein. A g Node B (gNB) may associate a reference signal to a beam pattern (or beam configuration) and prepare Downlink Control Information (DCI) of a Physical Downlink Control Channel (PDCCH) that includes aperiodic Channel-State Information Reference Signal (AP CSI-RS) information indicating the beam pattern. A user equipment (UE) may decode the DCI, extract the AP CSI-RS information, update the beam pattern of a reference signal based on the AP CSI-RS information, and generate an uplink (UL) feedback message indicating that the PDCCH was successfully decoded by the UE. The gNB may then decode the uplink (UL) feedback message and, in response, update a receive (Continued)

(RX) beam of the gNB to correspond to the beam pattern associated to the reference signal.

12 Claims, 12 Drawing Sheets

(51) Int. Cl.
    *H04W 72/044*     (2023.01)
    *H04W 72/23*     (2023.01)
    *H04W 72/542*     (2023.01)

(58) Field of Classification Search
    CPC ..... H04L 5/0091; H04L 5/0048; H04B 7/063; H04B 7/0639; H04B 7/0695; H04B 7/088
    See application file for complete search history.

(56) References Cited

U.S. PATENT DOCUMENTS

| | | | |
|---|---|---|---|
| 2017/0048879 A1* | 2/2017 | Zhang | H04W 76/27 |
| 2017/0208590 A1* | 7/2017 | Kim | H04L 5/001 |
| 2018/0219606 A1* | 8/2018 | Ng | H04L 25/0204 |
| 2018/0227031 A1* | 8/2018 | Guo | H04W 24/10 |
| 2019/0069285 A1* | 2/2019 | Chandrasekhar | H04B 7/0695 |
| 2019/0174480 A1* | 6/2019 | Wong | H04L 5/0055 |
| 2019/0215096 A1* | 7/2019 | Kim | H04L 1/0025 |
| 2019/0393988 A1* | 12/2019 | Bae | H04L 1/08 |
| 2020/0037297 A1* | 1/2020 | Pan | H04W 72/30 |
| 2020/0053764 A1 | 2/2020 | Kim et al. | |
| 2020/0112993 A1* | 4/2020 | Tsai | H04W 72/046 |
| 2020/0145079 A1* | 5/2020 | Marinier | H04W 56/0045 |
| 2020/0212981 A1* | 7/2020 | Guo | H04L 5/0053 |
| 2021/0028889 A1* | 1/2021 | Stathakis | H04L 1/189 |
| 2021/0084623 A1 | 3/2021 | Zhang et al. | |
| 2021/0314964 A1* | 10/2021 | Zhou | H04W 72/56 |
| 2022/0007406 A1* | 1/2022 | Matsumura | H04L 5/0051 |
| 2022/0022207 A1* | 1/2022 | Matsumura | H04W 72/54 |
| 2022/0256458 A1* | 8/2022 | Noh | H04W 52/0229 |

FOREIGN PATENT DOCUMENTS

| | | |
|---|---|---|
| WO | 2018143702 A1 | 8/2018 |
| WO | 2018175840 A1 | 9/2018 |

\* cited by examiner

METHODS OF IMPROVING THE ROBUSTNESS FOR DCI TRIGGERED BEAM UPDATE IN 5G NR

CROSS-REFERENCE TO RELATED APPLICATION(S)

This application is a national stage filing under 35 U.S.C. § 371 of International Patent Application No. PCT/US2020/031102 filed May 1, 2020, which claims the benefit of U.S. Provisional Application No. 62/842,006 filed May 2, 2019, entitled "METHODS OF IMPROVING THE ROBUSTNESS FOR DCI TRIGGERED BEAM UPDATE IN 5G NR," each of which is hereby incorporated by reference herein in its entirety.

TECHNICAL FIELD

This application relates generally to wireless communication systems, and more specifically to improving robustness in DCI triggered beam updates in 5G NR.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
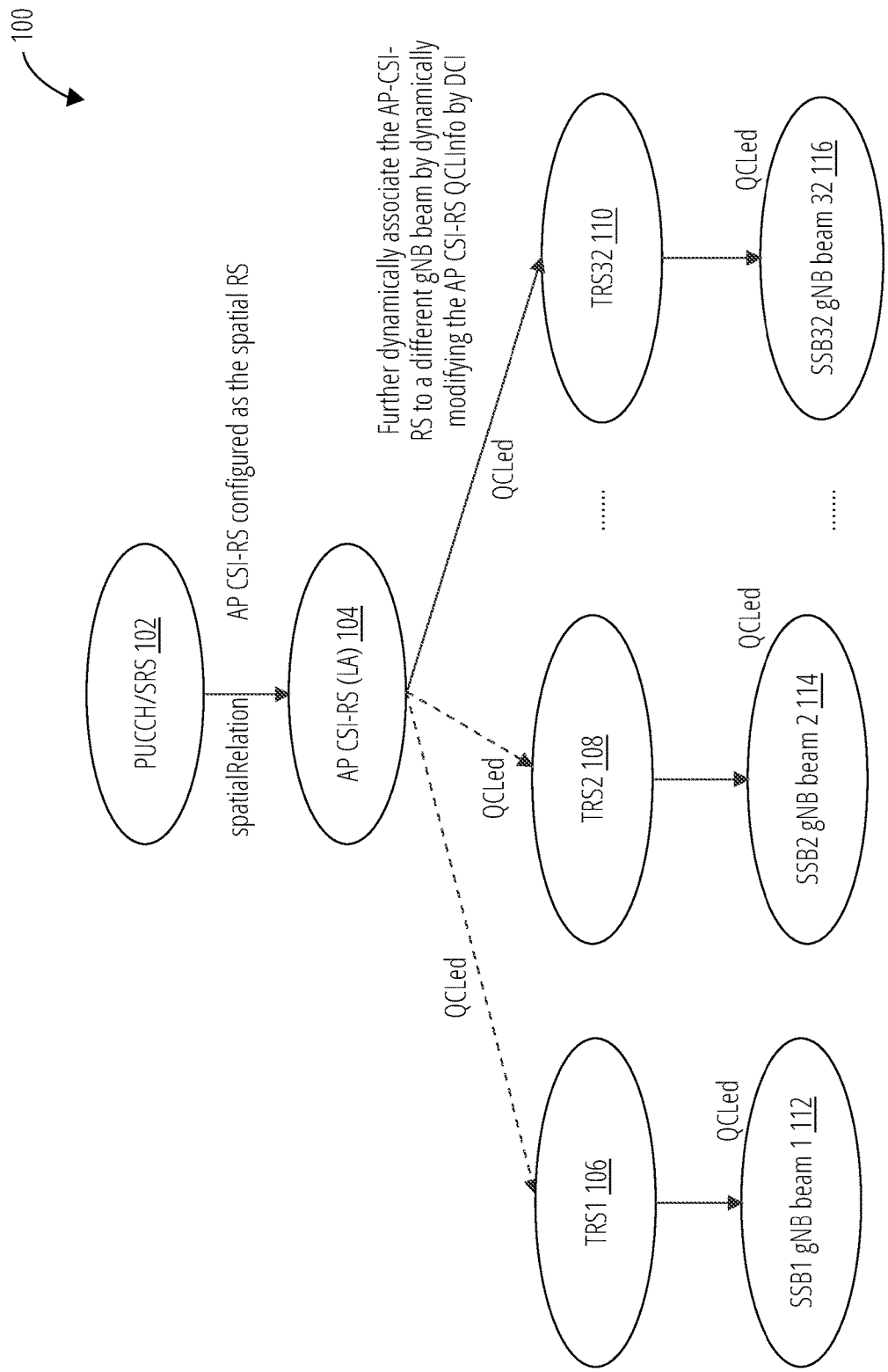
FIG. 1 illustrates a diagram showing one example of using DCI to update the beam associated to a spatial RS, which is used for UE TX beam switching, according to an embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In 5G NR frequency range 2 (FR2), User Equipment (UE) is able to apply antenna array based analog beamforming for downlink (DL) reception and uplink (UL) transmission. For UL transmission, the transmission antenna array setting (sometimes called "spatial domain transmit (TX) filter setting" by, e.g., 3GPP specification(s)) is determined by spatial reference signals (RS) which are indicated by higher layers from the network to UE (e.g. by the MAC Control Element or Radio Resource Control (RRC)). To transmit a particular UL channel (Sounding Reference Signal (SRS)/Physical Uplink Shared Channel (PUSCH)/Physical Uplink Control Channel (PUCCH), etc.), after determining the spatial reference signal (spatial RS) (Synchronization Signal Block (SSB)/Channel-State Information Reference Signal (CSI-RS)/SRS) for the dedicated UL channel, UE should use the same spatial domain TX filter setting used for the reception (or transmission) of the identified spatial reference signal to transmit the particular UL channel. Because the communication between a UE performing TX and a gNB performing receive (RX) is beam dependent, during UE mobility (when the propagation angle is changed) the spatial RS needs to be dynamically re-selected to allow for the switching of the gNB beam and the UE beam.

Furthermore, for 5G NR FR2, on the UE side, in order to calculate the expected transmission power for transmitting UL channels (e.g., PUSCH, PUCCH, SRS, Physical Random Access Channel (PRACH), etc.), the UE may measure the path-loss values based on the received DL signals and compensate the path-loss in a UL transmission power calculation. As opposed to the case of 4G LTE, in 5G NR, because of UL beamforming, the DL reference signals that can be used for path-loss calculation are also beam dependent and need to be dynamically re-selected. Since each UL channel may be associated to a different gNB beam, for each target UL channel, the gNB may explicitly configure a dedicated DL reference signal as the path-loss (PL) reference signal for path-loss measurement.

The beam information associated with either a spatial RS and/or a PL RS may be explicitly or implicitly updated by Downlink Control Information (DCI), which is carried by the Physical Downlink Control Channel (PDCCH). For example, for spatial RS, RRC could explicitly pre-configure one aperiodic CSI-RS (AP CSI-RS) as the spatial RS for a target UL channel (e.g. PUCCH). Then, by dynamically modifying the Quasi Co-location (QCL) linking of the pre-configured AP CSI-RS with a further DL RS associated to a different beam, the beam information of the spatial RS is updated. As another example using PL RS, RRC could explicitly pre-configure one aperiodic CSI-RS (AP CSI-RS) as the PL RS for PL measurement for a target UL channel (e.g. SRS). Then, by dynamically modifying the QCL linking of the pre-configured AP CSI-RS with a further DL RS associated to a different beam, the beam information of the PL measurement is updated.

FIG. 1 illustrates a diagram 100 showing one example of using DCI to update the beam associated to a spatial RS, which is used for UE TX beam switching, according to an embodiment. A UL channel such as the PUCCH or SRS 102 is associated with the AP CSI-RS 104, which is pre-configured as a spatial RS for the PUCCH or SRS 102. AP CSI-RS QCLinfo in DCI is then dynamically modified to indicate that the AP CSI-RS 104 is quasi co-located (QCLed) with, e.g., a Tracking Reference Signal (TRS) such as one of the TRS1 106 (which is QCLed with the SSB1 gNB beam 1 112), the TRS2 108 (which is QCLed with the SSB2 gNB beam 2 114), etc., up through the TRS32 110 (which is QCLed with the SSB32 gNB beam 32 116).

Figure 2:
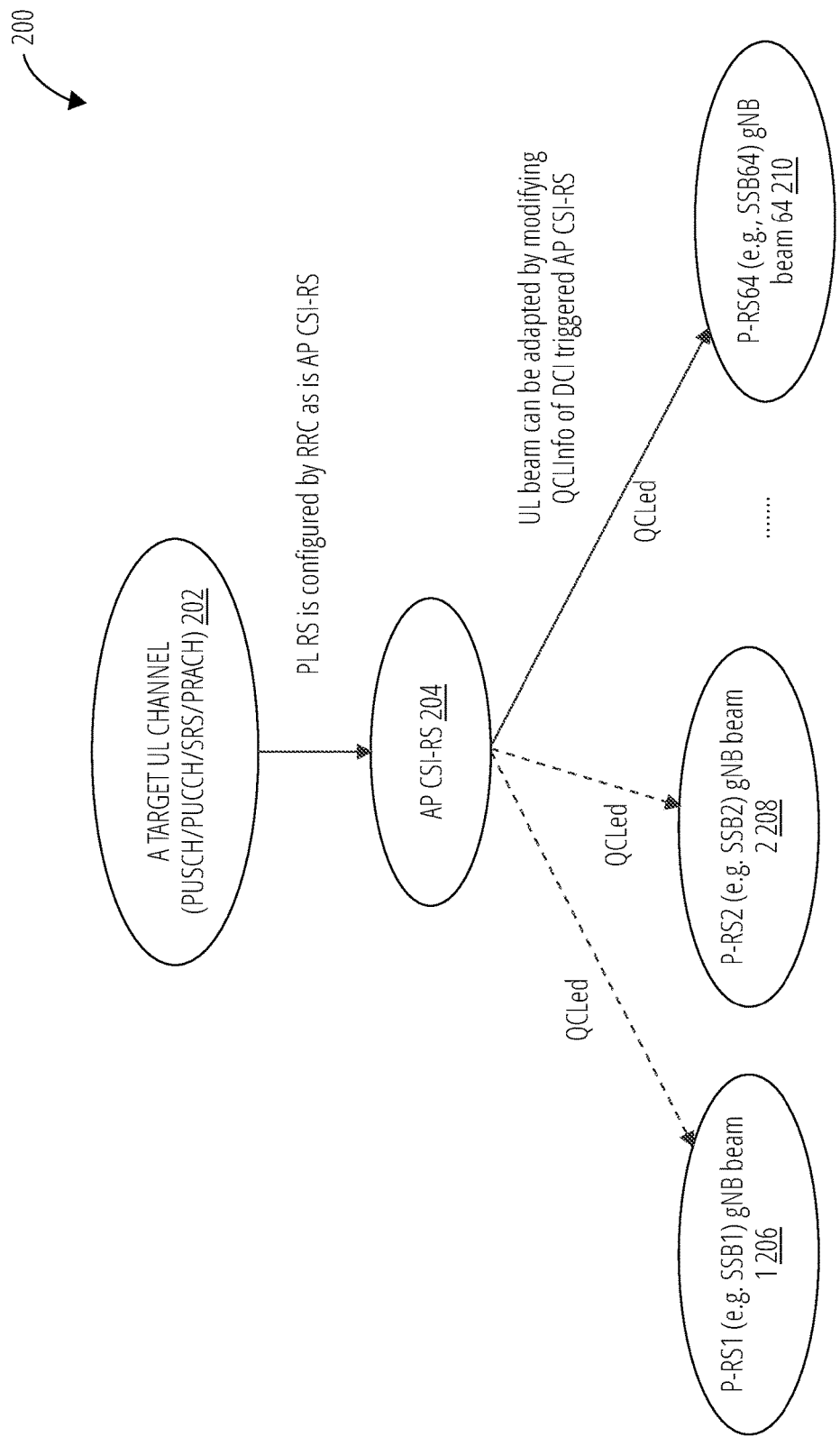
FIG. 2 illustrates a diagram showing another example of using DCI to update the beam information associated to an explicitly configured PL RS used for PL, according to an embodiment.

FIG. 2 illustrates a diagram 200 showing another example of using DCI to update the beam information associated to an explicitly configured PL RS used for PL, according to an embodiment. A target UL channel such as the PUSCH or PUCCH or SRS or PRACH 202 is associated with the AP CSI-RS 204 (which is configured as the PL RS). QCLInfo of the DCI triggered AP CSI-RS may be modified to adapt the UL beam. This QCLInfo may be dynamically modified to indicated that the AP CSI-RS 204 is QCLed with, e.g., a Positioning Reference Signal (P-RS) such as one of the P-RS1 (e.g. SSB1) gNB of beam 1 206, the P-RS2 (e.g. SSB2) of gNB beam 2 208, etc., up through the P-RS64 (e.g., SSB64) of gNB beam 64 210.

When performing these DCI based beam updates for spatial RS or PL RS, a UE may fail to detect the PDCCH which carries the DCI that triggers the AP CSI-RS as well as updates its QCL information. Accordingly, the UE does not receive the beam update information and will not update the UE TX beam. However, since the gNB does not know whether or not the UE has detected the PDCCH, the gNB may assume that the UE has updated the UE TX beam and update the gNB RX beam accordingly. This can cause beam mismatch between UE TX and the gNB RX, which further degrades the UL performance.

Various embodiments disclosed herein provide improvements to the robustness of DCI triggered beam updates in 5G NR, in particular for beam updates for UL spatial RS and PL RS.

In some embodiments, the DCI that triggers the AP CSI-RS information for beam updates is extended to further contain a trigger of an aperiodic SRS (AP-SRS). The AP SRS is spatially associated to the AP CSI-RS within the same DCI. After the UE has decoded the PDCCH, the UE updates the TX beam based on the AP CSI-RS information. Further, the UE also transmits the triggered AP SRS back to the base station, which confirms to the base station the safe decoding of the PDCCH. By receiving the AP SRS, the gNB receives this confirmation from the UE and can therefore safely update the gNB RX beam accordingly.

In some embodiments, the UE confirmation of successfully decoding of such PDCCH can also be indicated by sending a PRACH signal to the base station, wherein the PRACH signal is associated with the AP CSI-RS from the DCI.

Robust UL beam switching and PL measurement in high mobility and low SNR scenarios may result in improved UL performance in FR2.

In order to improve the robustness of a DCI triggered beam update in 5G NR, in particular for the aperiodic (dynamic) beam update for UL spatial RS and PL RS, various embodiments provide that the DCI that triggers the AP CSI-RS information for beam updates may also contain a trigger of an aperiodic SRS (AP-SRS), wherein the AP SRS is spatially associated to the AP CSI-RS within the same DCI. Upon decoding the DCI from a detected PDCCH, the UE may then update the TX beam based on the triggered AP CSI-RS information and may also transmit the triggered AP SRS to the base station. By receiving the AP SRS, the gNB gets a confirmation that the PDCCH was successfully decoded by the UE and that the gNB can therefore safely update gNB RX beam accordingly.

Figure 3:
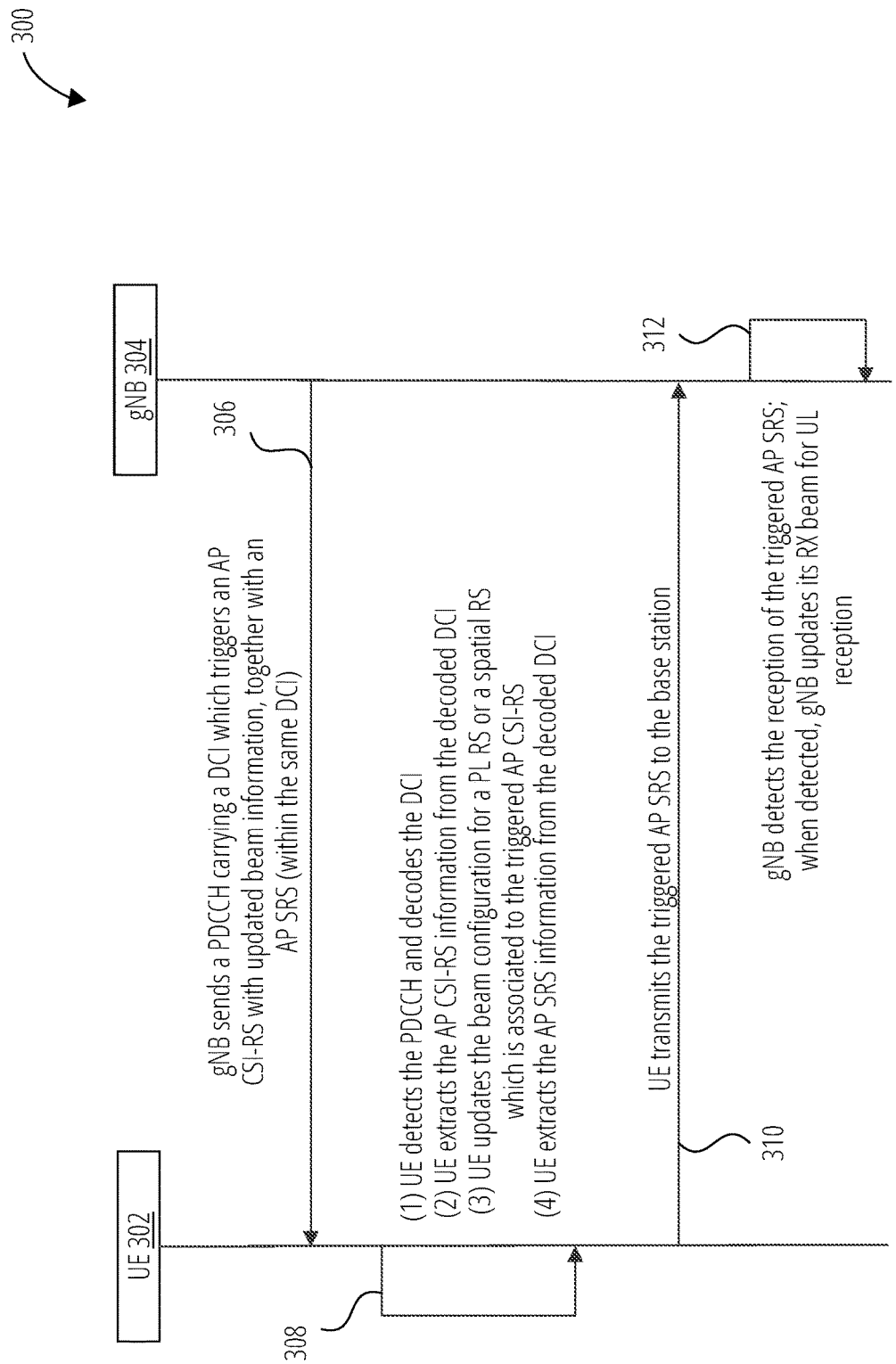
FIG. 3 illustrates a sequence between a UE and a gNB for using DCI that triggers AP CSI-RS information for beam updates, according to an embodiment.

FIG. 3 illustrates a sequence 300 between a UE 302 and a gNB 304 for using DCI that triggers AP CSI-RS information for beam updates, according to an embodiment. In communication 306, the gNB 304 sends a PDCCH carrying a DCI which triggers an AP CSI-RS with updated beam information, together with an AP SRS (within the same DCI), to the UE 302.

In processing 308, the UE (1) detects the PDCCH and decodes the DCI; (2) extracts the AP CSI-RS information from the decided DCI; (3) updates the beam configuration for a PL RS or a spatial RS which is associated to the triggered AP CSI-RS; and (4) extracts the AP SRS information from the decoded DCI.

In communication 310, the UE 302 transmits the triggered AP SRS to the base station. The triggered AP SRS may be an AP SRS generated using the AP SRS information that was extracted from the decoded DCI. The base station may be, e.g., the gNB 304.

In processing 312, the gNB 304 detects the reception of the triggered AP SRS; when the AP SRS is detected, the gNB updates its RX beam for UL reception.

Figure 4:
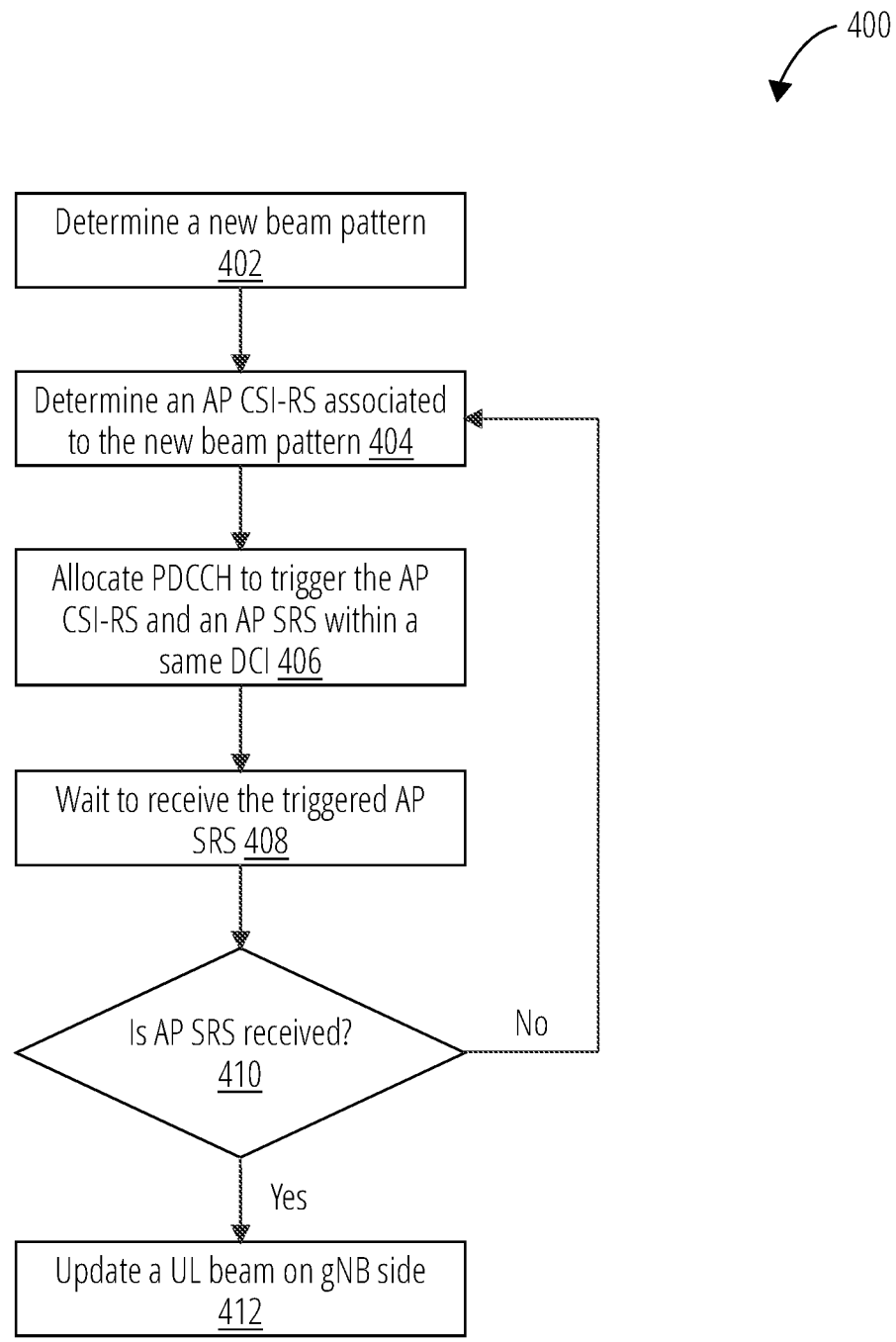
FIG. 4 illustrates a method of a gNB for using DCI that triggers AP CSI-RS information for beam updates, according to an embodiment.

FIG. 4 illustrates a method 400 of a gNB for using DCI that triggers AP CSI-RS information for beam updates, according to an embodiment. In block 402, the gNB determines a new beam pattern. In block 404, the gNB determines an AP CSR-RS associated to the new beam pattern. In block 406, the gNB allocates a PDCCH to trigger the AP CSI-RS and an AP SRS within a same DCI. In block 408, the gNB waits to receive the triggered AP SRS. In decision block 410 the gNB determines whether the AP SRS has been received. If not, the gNB returns to block 404. If the AP SRS has been received, the gNB proceeds to block 412 and updates a UL beam on the gNB side.

Additionally or alternatively, the UE may send back a PRACH signal to the base station to confirm that the DCI (as well as the beam update information) was safely decoded. The UE TX beam used to send this PRACH signal could be associated with the DCI triggered AP CSI-RS. In this embodiment, the proposed PRACH resource can be pre-configured by the gNB to the UE. It may be a contention free (CF) PRACH which is UE specific. The PRACH resource pre-configuration can be communicated through higher layer messages from the base station to the UE, for example, through RRC messaging. In certain embodiments, the PRACH preamble sequence is associated to the usage of DCI triggered beam updates confirmation.

In another embodiment, the UE updates the QCL or spatial relation info for a corresponding downlink/uplink signal which is QCLed with or spatially related to the AP CSI-RS in slot n+K, where the uplink signal (e.g., SRS, PUSCH, and so on) triggered by the DCI is transmitted in slot n. If there are multiple uplink signals triggered by the DCI, or if the uplink signal triggered by DCI takes multiple slots, the slot n may indicate the slot including the first (or, alternatively, the last) symbol of the uplink signal. The value of K may be predefined or configured by higher layer signaling, and may be determined by the subcarrier spacing of the bandwidth part in the PDCCH bandwidth part and/or that of the bandwidth part with the scheduled uplink signal.

Figure 5:
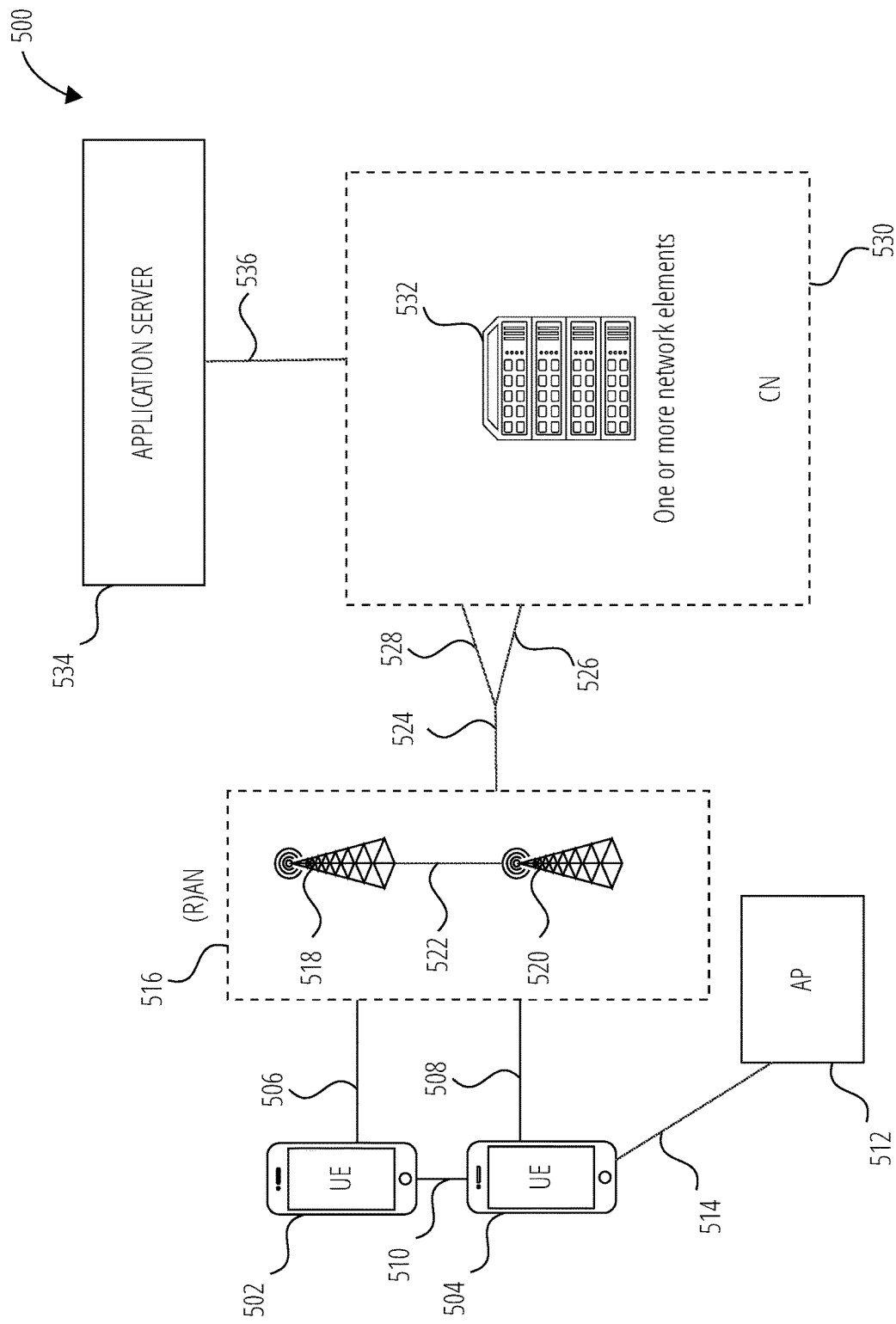
FIG. 5 illustrates a system in accordance with one embodiment.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 502 and UE 504. In this example, the UE 502 and the UE 504 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 502 and/or the UE 504 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 502 and UE 504 may be configured to connect, for example, communicatively couple, with an access node or radio access node (shown as (R)AN 516). In embodiments, the (R)AN 516 may be an NG RAN or a 5G RAN, an E-UTRAN, or a legacy RAN, such as a UTRAN or GERAN. As used herein, the term "NG RAN" or the like may refer to a (R)AN 516 that operates in an NR or 5G system, and the term "E-UTRAN" or the like may refer to a (R)AN 516 that operates in an LTE or 4G system. The UE 502 and UE 504 utilize connections (or channels) (shown as connection 506 and connection 508, respectively), each of which comprises a physical communications interface or layer (discussed in further detail below).

In this example, the connection 506 and connection 508 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 502 and UE 504 may directly exchange communication data via a ProSe interface 510. The ProSe interface 510 may alternatively be referred to as a sidelink (SL) interface SSB1 gNB beam 1 112 and may comprise one or more logical channels, including but not limited to a PSCCH, a PSSCH, a PSDCH, and a PSBCH.

The UE 504 is shown to be configured to access an AP 512 (also referred to as "WLAN node," "WLAN," "WLAN Termination," "WT" or the like) via connection 514. The connection 514 can comprise a local wireless connection, such as a connection consistent with any IEEE 802.11 protocol, wherein the AP 512 would comprise a wireless fidelity (Wi-Fi®) router. In this example, the AP 512 may be connected to the Internet without connecting to the core network of the wireless system (described in further detail below). In various embodiments, the UE 504, (R)AN 516, and AP 512 may be configured to utilize LWA operation and/or LWIP operation. The LWA operation may involve the UE 504 in RRC_CONNECTED being configured by the RAN node 518 or the RAN node 520 to utilize radio resources of LTE and WLAN. LWIP operation may involve the UE 504 using WLAN radio resources (e.g., connection 514) via IPsec protocol tunneling to authenticate and encrypt packets (e.g., IP packets) sent over the connection 514. IPsec tunneling may include encapsulating the entirety of original IP packets and adding a new packet header, thereby protecting the original header of the IP packets.

The (R)AN 516 can include one or more AN nodes, such as RAN node 518 and RAN node 520, that enable the connection 506 and connection 508. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 500 (e.g., an eNB). According to various embodiments, the RAN node 518 or RAN node 520 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 518 or RAN node 520 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 518 or RAN node 520); a MAC/PHY split wherein RRC, PDCP, RLC, and MAC layers are operated by the CRAN/vBBUP and the PHY layer is operated by individual RAN nodes (e.g., RAN node 518 or RAN node 520); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 518 or RAN node 520 to perform other virtualized applications. In some implementations, an individual RAN node may represent individual gNB-DUs that are connected to a gNB-CU via individual F1 interfaces (not shown by FIG. 5). In these implementations, the gNB-DUs may include one or more remote radio heads or RFEMs, and the gNB-CU may be operated by a server that is located in the (R)AN 516 (not shown) or by a server pool in a similar manner as the CRAN/vBBUP. Additionally, or alternatively, one or more of the RAN node 518 or RAN node 520 may be next generation eNBs (ng-eNBs), which are RAN nodes that provide E-UTRA user plane and control plane protocol terminations toward the UE 502 and UE 504, and are connected to an SGC via an NG interface (discussed infra). In V2X scenarios one or more of the RAN node 518 or RAN node 520 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 518 and/or the RAN node 520 can terminate the air interface protocol and can be the first point of contact for the UE 502 and UE 504. In some embodiments, the RAN node 518 and/or the RAN node 520 can fulfill various logical functions for the (R)AN 516 including, but not limited to, radio network controller (RNC) functions such as radio bearer management, uplink and downlink dynamic radio resource management and data packet scheduling, and mobility management.

In embodiments, the UE 502 and UE 504 can be configured to communicate using OFDM communication signals with each other or with the RAN node 518 and/or the RAN node 520 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 518 and/or the RAN node 520 to the UE 502 and UE 504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 502 and UE 504 and the RAN node 518 and/or the RAN node 520 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 502 and UE 504 and the RAN node 518 or RAN node 520 may operate using LAA, eLAA, and/or feLAA mechanisms. In these implementations, the UE 502 and UE 504 and the RAN node 518 or RAN node 520 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 502 and UE 504, RAN node 518 or RAN node 520, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 502, AP 512, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 502 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 502 and UE 504. The PDCCH carries information about the transport format and resource allocations related to the PDSCH channel, among other things. It may also inform the UE 502 and UE 504 about the transport format, resource allocation, and HARQ information related to the uplink shared channel. Typically, downlink scheduling (assigning control and shared channel resource blocks to the UE 504 within a cell) may be performed at any of the RAN node 518 or RAN node 520 based on channel quality information fed back from any of the UE 502 and UE 504. The downlink resource assignment information may be sent on the PDCCH used for (e.g., assigned to) each of the UE 502 and UE 504.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 518 or RAN node 520 may be configured to communicate with one another via interface 522. In embodiments where the system 500 is an LTE system (e.g., when CN 530 is an EPC), the interface 522 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 502 from an SeNB for user data; information of PDCP PDUs that were not delivered to a UE 502; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system (e.g., when CN 530 is an 5GC), the interface 522 may be an Xn interface. The Xn interface is defined between two or more RAN nodes (e.g., two or more gNBs and the like) that connect to 5GC, between a RAN node 518 (e.g., a gNB) connecting to 5GC and an eNB, and/or between two eNBs connecting to 5GC (e.g., CN 530). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 502 in a connected mode (e.g., CM-CONNECTED) including functionality to manage the UE mobility for connected mode between one or more RAN node 518 or RAN node 520. The mobility support may include context transfer from an old (source) serving RAN node 518 to new (target) serving RAN node 520; and control of user plane tunnels between old (source) serving RAN node 518 to new (target) serving RAN node 520. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 516 is shown to be communicatively coupled to a core network—in this embodiment, CN 530. The CN 530 may comprise one or more network elements 532, which are configured to offer various data and telecommunications services to customers/subscribers (e.g., users of UE 502 and UE 504) who are connected to the CN 530 via the (R)AN 516. The components of the CN 530 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 530 may be referred to as a network slice, and a logical instantiation of a portion of the CN 530 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 534 may be an element offering applications that use IP bearer resources with the core network (e.g., UMTS PS domain, LTE PS data services, etc.). The application server 534 can also be configured to support one or more communication services (e.g., VoIP sessions, PTT sessions, group communication sessions, social networking services, etc.) for the UE 502 and UE 504 via the EPC. The application server 534 may communicate with the CN 530 through an IP communications interface 536.

In embodiments, the CN 530 may be an 5GC, and the (R)AN SSB32 gNB beam 32 116 may be connected with the CN 530 via an NG interface 524. In embodiments, the NG interface 524 may be split into two parts, an NG user plane (NG-U) interface 526, which carries traffic data between the RAN node 518 or RAN node 520 and a UPF, and the S1 control plane (NG-C) interface 528, which is a signaling interface between the RAN node 518 or RAN node 520 and AMFs.

In embodiments, the CN 530 may be a 5G CN, while in other embodiments, the CN 530 may be an EPC). Where CN 530 is an EPC, the (R)AN SSB32 gNB beam 32 116 may be connected with the CN 530 via an S1 interface 524. In embodiments, the S1 interface 524 may be split into two parts, an S1 user plane (S1-U) interface 526, which carries traffic data between the RAN node 518 or RAN node 520 and the S-GW, and the S1-MME interface 528, which is a signaling interface between the RAN node 518 or RAN node 520 and MMEs.

Figure 6:
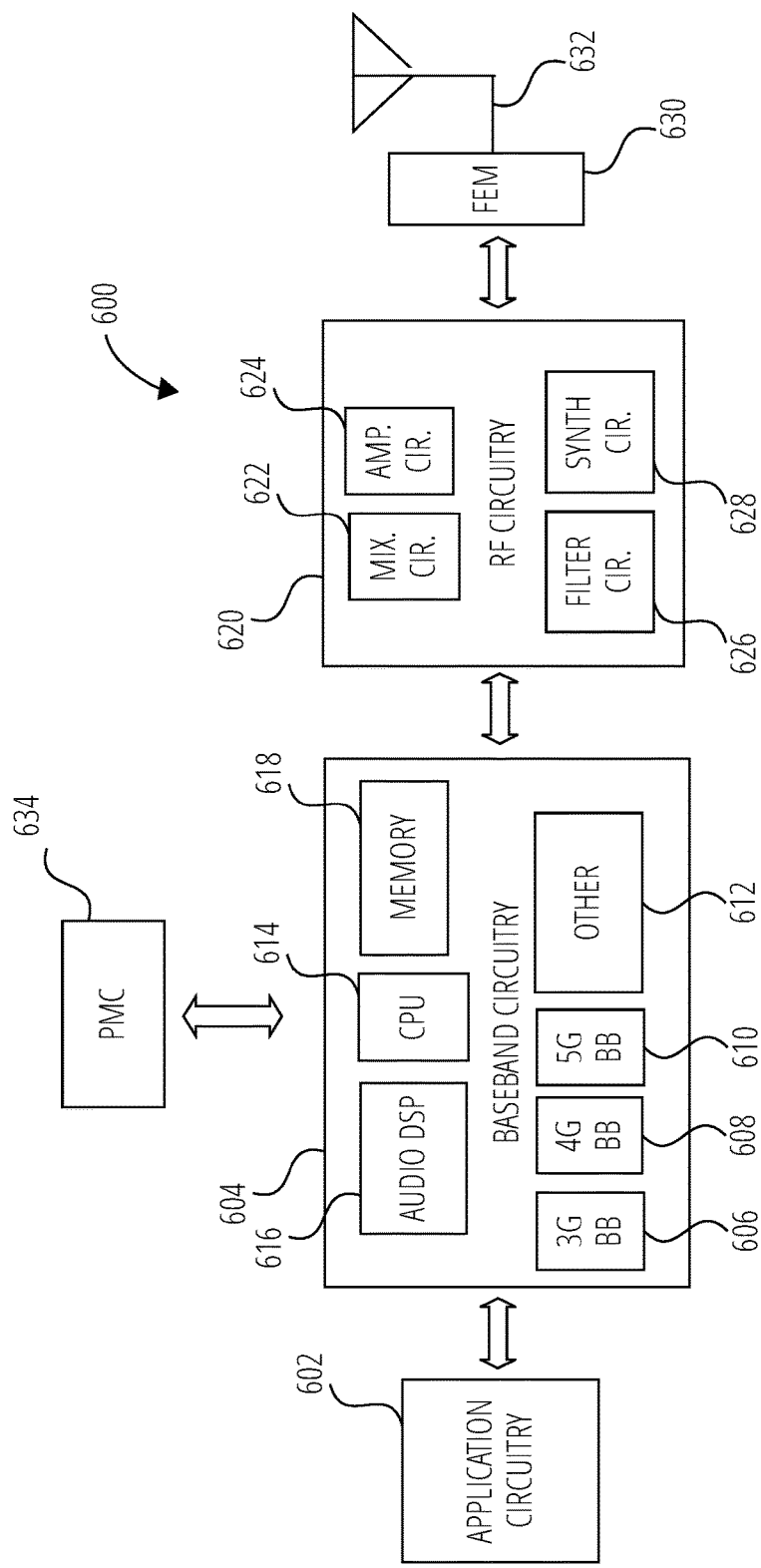
FIG. 6 illustrates a device in accordance with one embodiment.

FIG. 6 illustrates example components of a device 600 in accordance with some embodiments. In some embodiments, the device 600 may include application circuitry 602, baseband circuitry 604, Radio Frequency (RF) circuitry (shown as RF circuitry 620), front-end module (FEM) circuitry (shown as FEM circuitry 630), one or more antennas 632, and power management circuitry (PMC) (shown as PMC 634) coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/ storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 620 and to generate baseband signals for a transmit signal path of the RF circuitry 620. The baseband circuitry 604 may interface with the application circuitry 602 for generation and processing of the baseband signals and for controlling operations of the RF circuitry 620. For example, in some embodiments, the baseband circuitry 604 may include a third generation (3G) baseband processor (3G baseband processor 606), a fourth generation (4G) baseband processor (4G baseband processor 608), a fifth generation (5G) baseband processor (5G baseband processor 610), or other baseband processor(s) 612 for other existing generations, generations in development or to be developed in the future (e.g., second generation (2G), sixth generation (6G), etc.). The baseband circuitry 604 (e.g., one or more of baseband processors) may handle various radio control functions that enable communication with one or more radio networks via the RF circuitry 620. In other embodiments, some or all of the functionality of the illustrated baseband processors may be included in modules stored in the memory 618 and executed via a Central Processing Unit (CPU 614). The radio control functions may include, but are not limited to, signal modulation/demodulation, encoding/ decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include a digital signal processor (DSP), such as one or more audio DSP(s) 616. The one or more audio DSP(s) 616 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

The RF circuitry 620 may enable communication with wireless networks using modulated electromagnetic radiation through a non-solid medium. In various embodiments, the RF circuitry 620 may include switches, filters, amplifiers, etc. to facilitate the communication with the wireless network. The RF circuitry 620 may include a receive signal path which may include circuitry to down-convert RF signals received from the FEM circuitry 630 and provide baseband signals to the baseband circuitry 604. The RF circuitry 620 may also include a transmit signal path which may include circuitry to up-convert baseband signals provided by the baseband circuitry 604 and provide RF output signals to the FEM circuitry 630 for transmission.

In some embodiments, the receive signal path of the RF circuitry 620 may include mixer circuitry 622, amplifier circuitry 624 and filter circuitry 626. In some embodiments, the transmit signal path of the RF circuitry 620 may include filter circuitry 626 and mixer circuitry 622. The RF circuitry 620 may also include synthesizer circuitry 628 for synthesizing a frequency for use by the mixer circuitry 622 of the receive signal path and the transmit signal path. In some embodiments, the mixer circuitry 622 of the receive signal path may be configured to down-convert RF signals received from the FEM circuitry 630 based on the synthesized frequency provided by synthesizer circuitry 628. The amplifier circuitry 624 may be configured to amplify the down-converted signals and the filter circuitry 626 may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 622 of the receive signal path may comprise passive mixers, although the scope of the embodiments is not limited in this respect.

In some embodiments, the mixer circuitry 622 of the transmit signal path may be configured to up-convert input baseband signals based on the synthesized frequency provided by the synthesizer circuitry 628 to generate RF output signals for the FEM circuitry 630. The baseband signals may be provided by the baseband circuitry 604 and may be filtered by the filter circuitry 626.

In some embodiments, the mixer circuitry 622 of the receive signal path and the mixer circuitry 622 of the transmit signal path may include two or more mixers and may be arranged for quadrature downconversion and upconversion, respectively. In some embodiments, the mixer circuitry 622 of the receive signal path and the mixer circuitry 622 of the transmit signal path may include two or more mixers and may be arranged for image rejection (e.g., Hartley image rejection). In some embodiments, the mixer circuitry 622 of the receive signal path and the mixer circuitry 622 may be arranged for direct downconversion and direct upconversion, respectively. In some embodiments, the mixer circuitry 622 of the receive signal path and the mixer circuitry 622 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 620 may include analog-to-digital converter (ADC) and digital-to-analog converter (DAC) circuitry and the baseband circuitry 604 may include a digital baseband interface to communicate with the RF circuitry 620.

In some dual-mode embodiments, a separate radio IC circuitry may be provided for processing signals for each spectrum, although the scope of the embodiments is not limited in this respect.

In some embodiments, the synthesizer circuitry 628 may be a fractional-N synthesizer or a fractional N/N+1 synthesizer, although the scope of the embodiments is not limited in this respect as other types of frequency synthesizers may be suitable. For example, synthesizer circuitry 628 may be a delta-sigma synthesizer, a frequency multiplier, or a synthesizer comprising a phase-locked loop with a frequency divider.

The synthesizer circuitry 628 may be configured to synthesize an output frequency for use by the mixer circuitry 622 of the RF circuitry 620 based on a frequency input and a divider control input. In some embodiments, the synthesizer circuitry 628 may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 628 of the RF circuitry 620 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 628 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 620 may include an IQ/polar converter.

The FEM circuitry 630 may include a receive signal path which may include circuitry configured to operate on RF signals received from one or more antennas 632, amplify the received signals and provide the amplified versions of the received signals to the RF circuitry 620 for further processing. The FEM circuitry 630 may also include a transmit signal path which may include circuitry configured to amplify signals for transmission provided by the RF circuitry 620 for transmission by one or more of the one or more antennas 632. In various embodiments, the amplification through the transmit or receive signal paths may be done solely in the RF circuitry 620, solely in the FEM circuitry 630, or in both the RF circuitry 620 and the FEM circuitry 630.

In some embodiments, the FEM circuitry 630 may include a TX/RX switch to switch between transmit mode and receive mode operation. The FEM circuitry 630 may include a receive signal path and a transmit signal path. The receive signal path of the FEM circuitry 630 may include an LNA to amplify received RF signals and provide the amplified received RF signals as an output (e.g., to the RF circuitry 620). The transmit signal path of the FEM circuitry 630 may include a power amplifier (PA) to amplify input RF signals (e.g., provided by the RF circuitry 620), and one or more filters to generate RF signals for subsequent transmission (e.g., by one or more of the one or more antennas 632).

In some embodiments, the PMC 634 may manage power provided to the baseband circuitry 604. In particular, the PMC 634 may control power-source selection, voltage scaling, battery charging, or DC-to-DC conversion. The PMC 634 may often be included when the device 600 is capable of being powered by a battery, for example, when the device 600 is included in a UE. The PMC 634 may increase the power conversion efficiency while providing desirable implementation size and heat dissipation characteristics.

FIG. 6 shows the PMC 634 coupled only with the baseband circuitry 604. However, in other embodiments, the PMC 634 may be additionally or alternatively coupled with, and perform similar power management operations for, other components such as, but not limited to, the application circuitry 602, the RF circuitry 620, or the FEM circuitry 630.

In some embodiments, the PMC 634 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
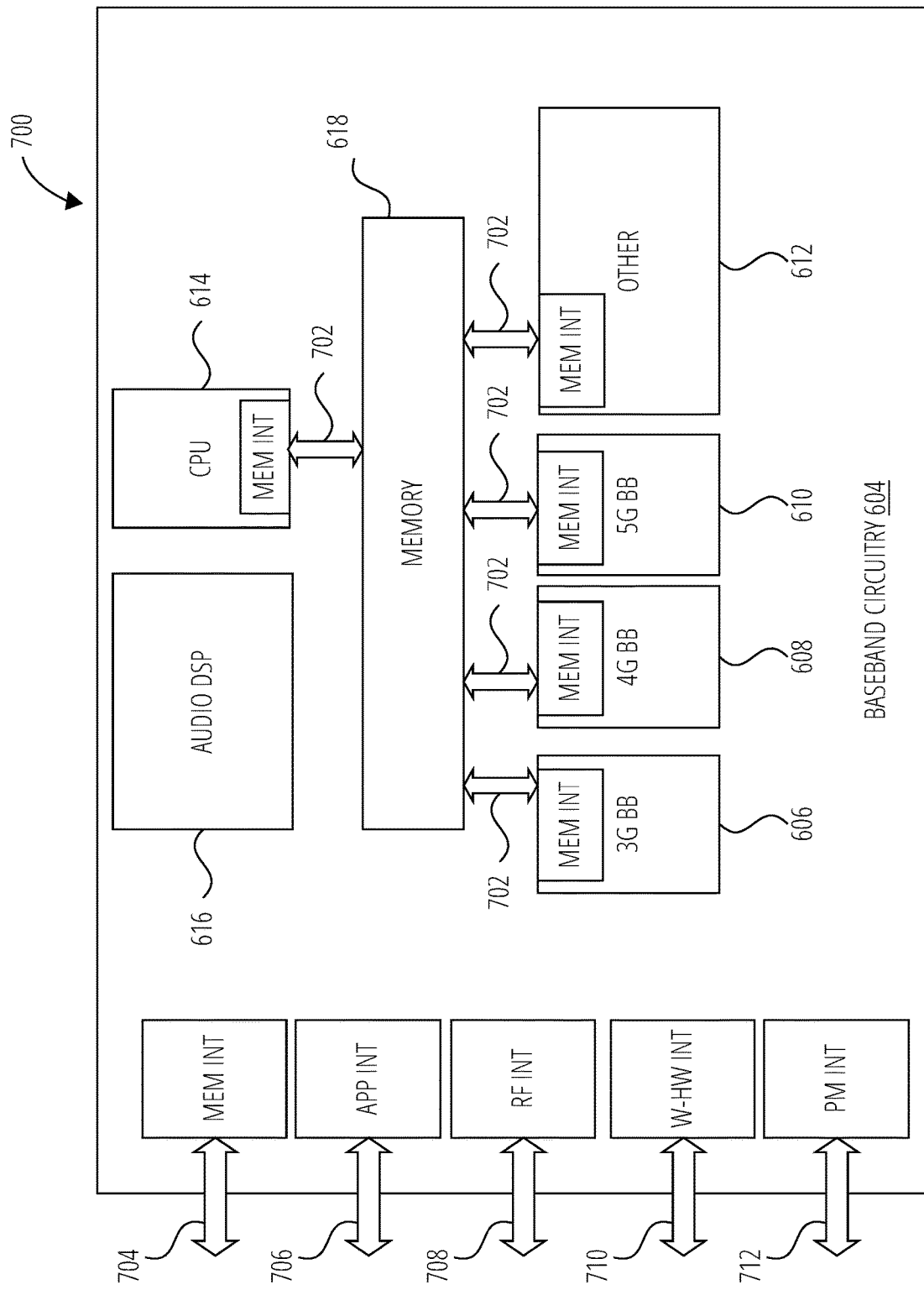
FIG. 7 illustrates example interfaces in accordance with one embodiment.

FIG. 7 illustrates example interfaces 700 of baseband circuitry in accordance with some embodiments. As discussed above, the baseband circuitry 604 of FIG. 6 may comprise 3G baseband processor 606, 4G baseband processor 608, 5G baseband processor 610, other baseband processor(s) 612, CPU 614, and a memory 618 utilized by said processors. As illustrated, each of the processors may include a respective memory interface 702 to send/receive data to/from the memory 618.

The baseband circuitry 604 may further include one or more interfaces to communicatively couple to other circuitries/devices, such as a memory interface 704 (e.g., an interface to send/receive data to/from memory external to the baseband circuitry 604), an application circuitry interface 706 (e.g., an interface to send/receive data to/from the application circuitry 602 of FIG. 6), an RF circuitry interface 708 (e.g., an interface to send/receive data to/from RF circuitry 620 of FIG. 6), a wireless hardware connectivity interface 710 (e.g., an interface to send/receive data to/from Near Field Communication (NFC) components, Bluetooth® components (e.g., Bluetooth® Low Energy), Wi-Fi® components, and other communication components), and a power management interface 712 (e.g., an interface to send/receive power or control signals to/from the PMC 634.

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 8:
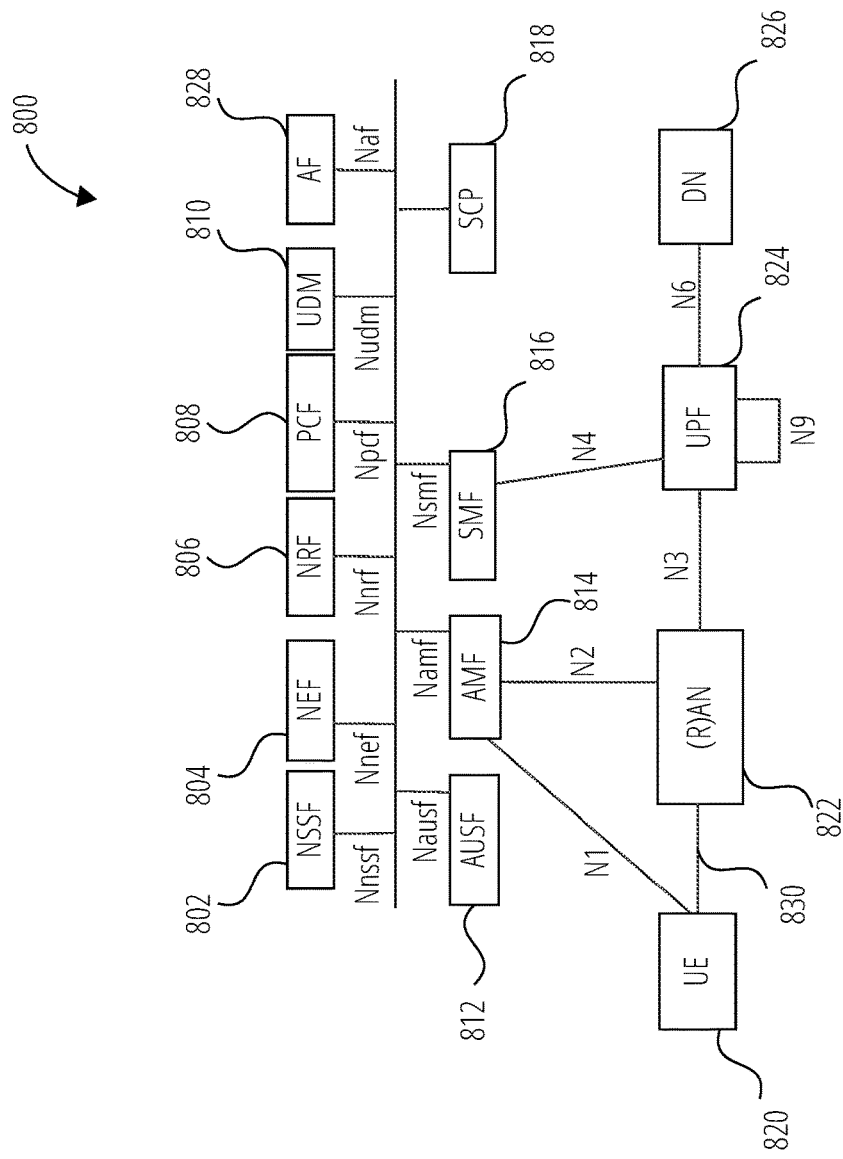
FIG. 8 illustrates an example service based architecture in accordance with certain embodiments.

FIG. 8 illustrates a service based architecture 800 in 5GS according to one embodiment. As described in 3GPP TS 23.501, the service based architecture 800 comprises NFs such as an NSSF 802, a NEF 804, an NRF 806, a PCF 808, a UDM 810, an AUSF 812, an AMF 814, an SMF 816, for communication with a UE 820, a (R)AN 822, a UPF 824, and a DN 826. The NFs and NF services can communicate directly, referred to as Direct Communication, or indirectly via a SCP 818, referred to as Indirect Communication. FIG. 8 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 8 are described below.

The NSSF 802 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 804 supports exposure of capabilities and events. NF capabilities and events may be securely exposed by the NEF 804 (e.g., for 3rd party, Application Functions, and/or Edge Computing). The NEF 804 may store/retrieve information as structured data using a standardized interface (Nudr) to a UDR. The NEF 804 may also secure provision of information from an external application to 3GPP network and may provide for the Application Functions to securely provide information to the 3GPP network (e.g., expected UE behavior, 5GLAN group information, and service specific information), wherein the NEF 804 may authenticate and authorize and assist in throttling the Application Functions. The NEF 804 may provide translation of internal-external information by translating between information exchanged with the AF and information exchanged with the internal network function. For example, the NEF 804 translates between an AF-Service-Identifier and internal 5G Core information such as DNN and S-NSSAI. The NEF 804 may handle masking of network and user sensitive information to external AF's according to the network policy. The NEF 804 may receive information from other network functions (based on exposed capabilities of other network functions), and stores the received information as structured data using a standardized interface to a UDR. The stored information can be accessed and re-exposed by the NEF 804 to other network functions and Application Functions, and used for other purposes such as analytics. For external exposure of services related to specific UE(s), the NEF 804 may reside in the HPLMN. Depending on operator agreements, the NEF 804 in the HPLMN may have interface(s) with NF(s) in the VPLMN. When a UE is capable of switching between EPC and 5GC, an SCEF+NEF may be used for service exposure.

The NRF 806 supports service discovery function by receiving an NF Discovery Request from an NF instance or SCP and providing the information of the discovered NF instances to the NF instance or SCP. The NRF 806 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 808 supports a unified policy framework to govern network behavior. The PCF 808 provides policy rules to Control Plane function(s) to enforce them. The PCF 808 accesses subscription information relevant for policy decisions in a Unified Data Repository (UDR). The PCF 808 may access the UDR located in the same PLMN as the PCF.

The UDM 810 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 810 uses subscription data (including authentication data) that may be stored in a UDR, in which case a UDM implements the application logic and may not require an internal user data storage and several different UDMs may serve the same user in different transactions. The UDM 810 may be located in the HPLMN of the subscribers it serves, and may access the information of the UDR located in the same PLMN.

The AF 828 interacts with the Core Network to provide services that, for example, support the following: application influence on traffic routing; accessing the NEF 804; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 804 to interact with relevant Network Functions.

The AUSF 812 supports authentication for 3GPP access and untrusted non-3GPP access. The AUSF 812 may also provide support for Network Slice-Specific Authentication and Authorization.

The AMF 814 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 814. Regardless of the number of Network functions, in certain embodiments there is only one NAS interface instance per access network between the UE and the CN, terminated at one of the Network functions that implements at least NAS security and Mobility Management. The AMF 814 may also include policy related functionalities.

In addition to the functionalities described above, the AMF 814 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 816 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 816 may include policy related functionalities.

The SCP 818 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 818 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 820 may include a device with radio communication capabilities. For example, the UE 820 may comprise a smartphone (e.g., handheld touchscreen mobile computing devices connectable to one or more cellular networks). The UE 820 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 820 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 820 may be configured to connect or communicatively couple with the (R)AN 822 through a radio interface 830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 820 and the (R)AN 822 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 822 to the UE 820 and a UL transmission may be from the UE 820 to the (R)AN 822. The UE 820 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 822 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 822 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 822) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 820 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 824 may act as an anchor point for intra-RAT and inter-RAT mobility, an external PDU session point of interconnect to the DN 826, and a branching point to support multi-homed PDU session. The UPF 824 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 824 may include an uplink classifier to support routing traffic flows to a data network. The DN 826 may represent various network operator services, Internet access, or third party services. The DN 826 may include, for example, an application server.

Figure 9:
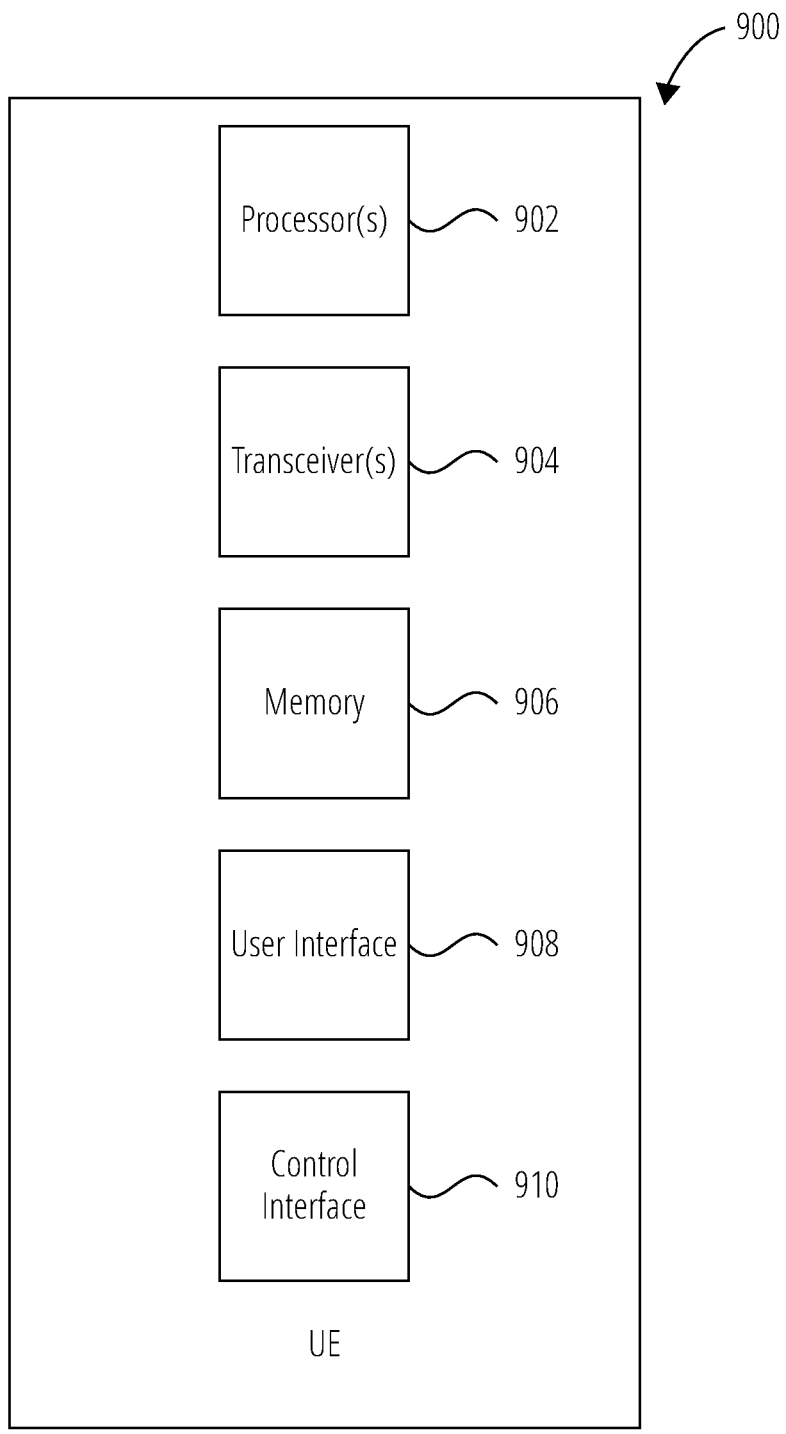
FIG. 9 illustrates a UE in accordance with one embodiment.

FIG. 9 is a block diagram of an example UE 900 configurable according to various embodiments of the present disclosure, including by execution of instructions on a computer-readable medium that correspond to any of the example methods and/or procedures described herein. The UE 900 comprises one or more processor 902, transceiver 904, memory 906, user interface 908, and control interface 910.

The one or more processor 902 may include, for example, an application processor, an audio digital signal processor, a central processing unit, and/or one or more baseband processors. Each of the one or more processor 902 may include internal memory and/or may include interface(s) to communication with external memory (including the memory 906). The internal or external memory can store software code, programs, and/or instructions for execution by the one or more processor 902 to configure and/or facilitate the UE 900 to perform various operations, including operations described herein. For example, execution of the instructions can configure the UE 900 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 904, user interface 908, and/or control interface 910. As another example, the one or more processor 902 may execute program code stored in the memory 906 or other memory that corresponds to MAC, RLC, PDCP, and RRC layer protocols standardized by 3GPP (e.g., for NR and/or LTE). As a further example, the processor 902 may execute program code stored in the memory 906 or other memory that, together with the one or more transceiver 904, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 906 may comprise memory area for the one or more processor 902 to store variables used in protocols, configuration, control, and other functions of the UE 900, including operations corresponding to, or comprising, any of the example methods and/or procedures described herein. Moreover, the memory 906 may comprise non-volatile memory (e.g., flash memory), volatile memory (e.g., static or dynamic RAM), or a combination thereof. Furthermore, the memory 906 may interface with a memory slot by which removable memory cards in one or more formats (e.g., SD Card, Memory Stick, Compact Flash, etc.) can be inserted and removed.

The one or more transceiver 904 may include radio-frequency transmitter and/or receiver circuitry that facilitates the UE 900 to communicate with other equipment supporting like wireless communication standards and/or protocols. For example, the one or more transceiver 904 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 902. The RF circuitry may also include a transmit signal path which may include circuitry to up-convert baseband signals provided by a baseband processor and provide RF output signals to the FEM for transmission.

The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 904 includes a transmitter and a receiver that enable the UE 900 to communicate with various 5G/NR networks according to various protocols and/or methods proposed for standardization by 3 GPP and/or other standards bodies. For example, such functionality can operate cooperatively with the one or more processor 902 to implement a PHY layer based on OFDM, OFDMA, and/or SC-FDMA technologies, such as described herein with respect to other figures.

The user interface 908 may take various forms depending on particular embodiments, or can be absent from the UE 900. In some embodiments, the user interface 908 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 900 may comprise a tablet computing device including a larger touchscreen display. In such embodiments, one or more of the mechanical features of the user interface 908 may be replaced by comparable or functionally equivalent virtual user interface features (e.g., virtual keypad, virtual buttons, etc.) implemented using the touchscreen display, as familiar to persons of ordinary skill in the art. In other embodiments, the UE 900 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 900 having a touch screen display are capable of receiving user inputs, such as inputs related to exemplary methods and/or procedures described herein or otherwise known to persons of ordinary skill in the art.

In some exemplary embodiments of the present disclosure, the UE 900 may include an orientation sensor, which can be used in various ways by features and functions of the UE 900. For example, the UE 900 can use outputs of the orientation sensor to determine when a user has changed the physical orientation of the UE 900's touch screen display. An indication signal from the orientation sensor can be available to any application program executing on the UE 900, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 910 may take various forms depending on particular embodiments. For example, the control interface 910 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 910 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 900 may include more functionality than is shown in FIG. 9 including, for example, a video and/or still-image camera, microphone, media player and/or recorder, etc. Moreover, the one or more transceiver 904 may include circuitry for communication using additional radio-frequency communication standards including Bluetooth, GPS, and/or others. Moreover, the one or more processor 902 may execute software code stored in the memory 906 to control such additional functionality. For example, directional velocity and/or position estimates output from a GPS receiver can be available to any application program executing on the UE 900, including various exemplary methods and/or computer-readable media according to various exemplary embodiments of the present disclosure.

Figure 10:
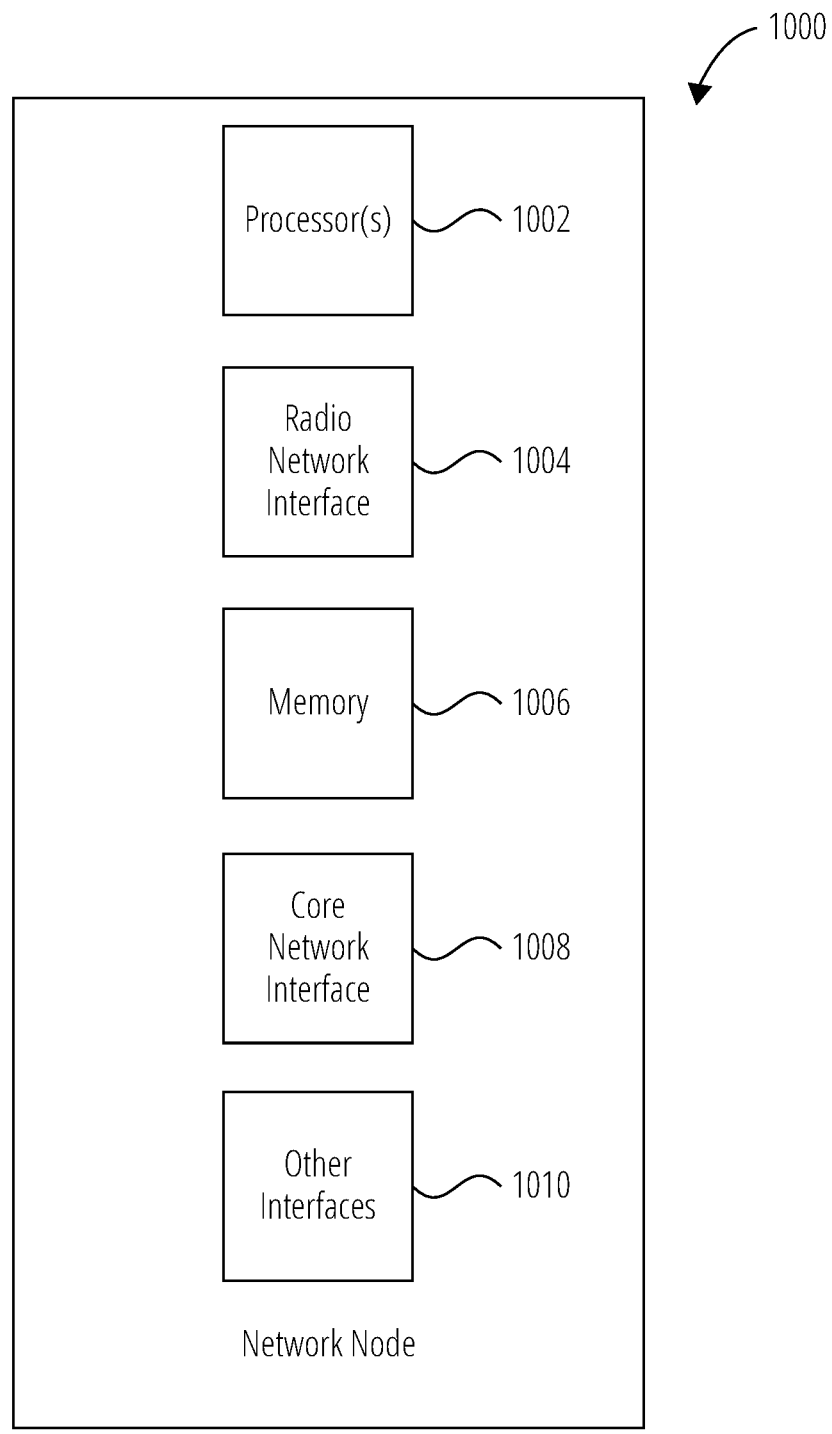
FIG. 10 illustrates a network node in accordance with one embodiment.

FIG. 10 is a block diagram of an example network node 1000 configurable according to various embodiments of the present disclosure, including by execution of instructions on a computer-readable medium that correspond to any of the example methods and/or procedures described herein.

The network node 1000 includes a one or more processor 1002, a radio network interface 1004, a memory 1006, a core network interface 1008, and other interfaces 1010. The network node 1000 may comprise, for example, a base station, eNB, gNB, access node, or component thereof.

The one or more processor 1002 may include any type of processor or processing circuitry and may be configured to perform an of the methods or procedures disclosed herein. The memory 1006 may store software code, programs, and/or instructions executed by the one or more processor 1002 to configure the network node 1000 to perform various operations, including operations described herein. For example, execution of such stored instructions can configure the network node 1000 to communicate with one or more other devices using protocols according to various embodiments of the present disclosure, including one or more methods and/or procedures discussed above. Furthermore, execution of such stored instructions can also configure and/or facilitate the network node 1000 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1004 and the core network interface 1008. By way of example and without limitation, the core network interface 1008 comprise an S1 interface and the radio network interface 1004 may comprise a Uu interface, as standardized by 3GPP. The memory 1006 may also store variables used in protocols, configuration, control, and other functions of the network node 1000. As such, the memory 1006 may comprise non-volatile memory (e.g., flash memory, hard disk, etc.), volatile memory (e.g., static or dynamic RAM), network-based (e.g., "cloud") storage, or a combination thereof.

The radio network interface 1004 may include transmitters, receivers, signal processors, ASICs, antennas, beamforming units, and other circuitry that enables network node 1000 to communicate with other equipment such as, in some embodiments, a plurality of compatible user equipment (UE). In some embodiments, the network node 1000 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1004 may include a PHY layer based on OFDM, OFDMA, and/or SC-FDMA technologies. In some embodiments, the functionality of such a PHY layer can be provided cooperatively by the radio network interface 1004 and the one or more processor 1002.

The core network interface 1008 may include transmitters, receivers, and other circuitry that enables the network node 1000 to communicate with other equipment in a core network such as, in some embodiments, circuit-switched (CS) and/or packet-switched Core (PS) networks. In some embodiments, the core network interface 1008 may include the S1 interface standardized by 3GPP. In some embodiments, the core network interface 1008 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1008 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1010 may include transmitters, receivers, and other circuitry that enables the network node 1000 to communicate with external networks, computers, databases, and the like for purposes of operations, administration, and maintenance of the network node 1000 or other network equipment operably connected thereto.

Figure 11:
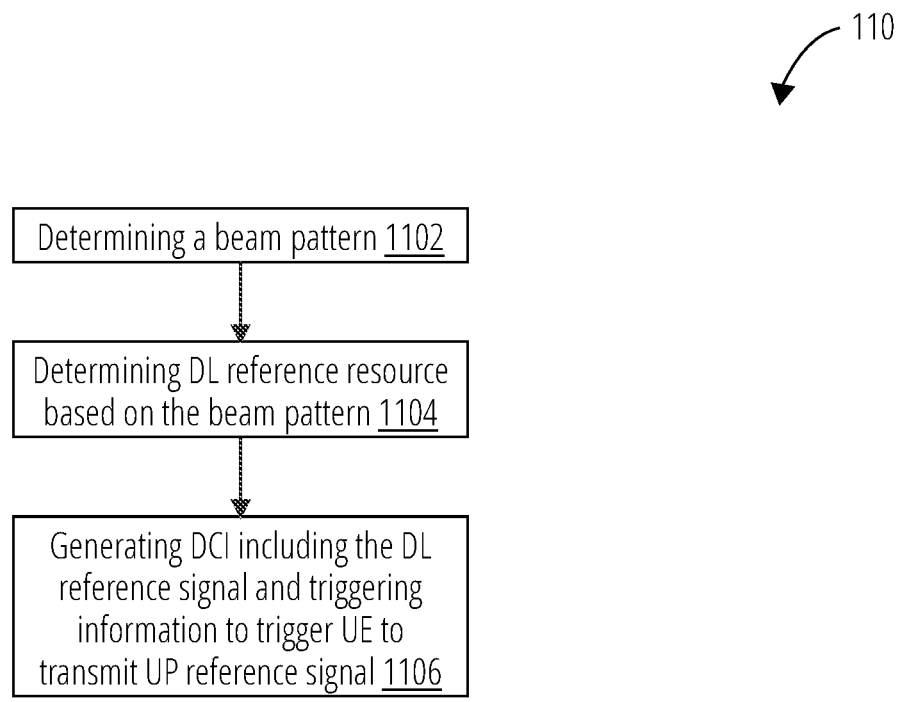
FIG. 11 illustrates a process according to embodiments herein.

In some embodiments, the electronic device(s), network(s), system(s), chip(s) or component(s), or portions or implementations thereof, of FIG. 5 through FIG. 10, or some other figure herein, may be configured to perform one or more processes, techniques, or methods as described herein, or portions thereof. FIG. 11 illustrates a process 1100 according to embodiments herein. For example, the process 1100 may include, at block 1102, determining or causing to determine a beam pattern; at block 1104, determining or causing to determine a downlink (DL) reference signal based on the beam pattern; and, at block 1106, generating or causing to generate a downlink control information (DCI), wherein the DCI includes the DL reference signal and triggering information to trigger a UE to transmit an uplink (UL) reference signal. In some embodiments, the DL reference signal may be a-periodic (AP) CSI-RS, the DCI may be carried by PDCCH, and the UL reference signal may be an AP SRS.

Figure 12:
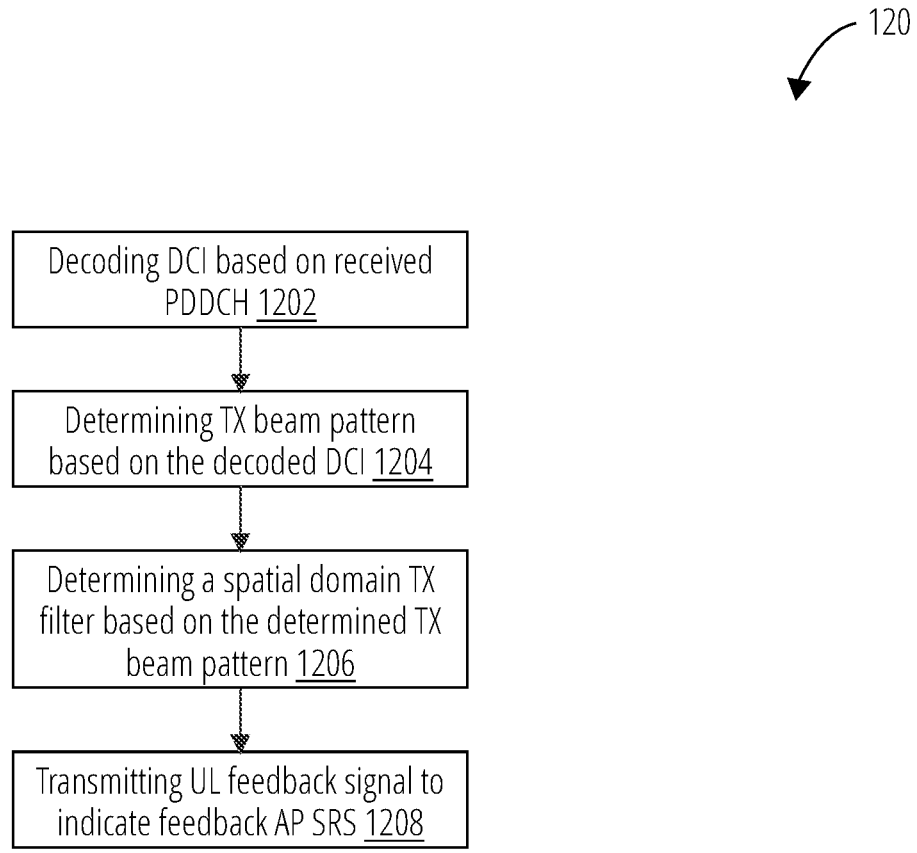
FIG. 12 illustrates another process according to embodiments herein.

FIG. 12 illustrates another process 1200 according to embodiments herein. For example, the process may include, at block 1202, decoding or causing to decode a downlink control information (DCI) based on a received PDCCH; at block 1204, determining or causing to determine a TX beam pattern based on the decoded DCI; at block 1206, determining or causing to determine a spatial domain TX filter based on the determined TX beam pattern; and, at block 1208, transmitting or causing to transmit an UL feedback signal to indicate a feedback AP SRS.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include a method of a UE, comprising: decoding Downlink Control Information (DCI) of a Physical Downlink Control Channel (PDCCH) to generate decoded DCI; extracting aperiodic Channel-State Information Reference Signal (AP CSI-RS) information from the decoded DCI; updating a beam configuration of a reference signal based on the AP CSI-RS information; and generating an uplink (UL) feedback message indicating that the PDCCH was successfully decoded by the UE.

Example 2 may include the method of Example 1, further comprising extracting aperiodic sounding reference signal (AP SRS) information from the decoded DCI; and wherein the UL feedback message comprises a triggered AP SRS based on the AP SRS information.

Example 3 may include the method of Example 2, wherein the triggered AP SRS is spatially associated with the reference signal.

Example 4 may include the method of Example 1, wherein the UL feedback message comprises a Physical Random Access Channel (PRACH) signal.

Example 5 may include the method of any of Examples 1-4, wherein updating the beam configuration of the reference signal comprises: determining a transmit (TX) beam pattern based on the extracted AP CSI-RS information; and determining a spatial domain TX filter based on the determined TX beam pattern.

Example 6 may include the method of any of Examples 1-5, wherein the beam configuration of the reference signal is updated based on an indication in the AP CSI-RS information that the reference signal is quasi co-located (QCLed) with a further downlink (DL) reference signal.

Example 7 may include the method of any of Examples 1-6, wherein the reference signal is one of a path-loss (PL) reference signal and a spatial reference signal.

Example 8 may include a method of a gNB, comprising: associating a reference signal to a beam pattern; preparing Downlink Control Information (DCI) of a Physical Downlink Control Channel (PDCCH), the DCI including AP CSI-RS information indicating the beam pattern associated to the reference signal; decoding an uplink (UL) feedback message indicating that the PDCCH was successfully decoded at a user equipment (UE); and updating a receive (RX) beam of the gNB to correspond to the beam pattern associated to the reference signal in response to decoding the UL feedback message.

Example 9 may include the method of Example 8, wherein the DCI further includes aperiodic sounding reference signal (AP SRS) information; and wherein the UL feedback message comprises a triggered AP SRS based on the AP SRS information.

Example 10 may include the method of Example 9, wherein the triggered AP SRS is spatially associated with the reference signal.

Example 11 may include the method of Example 8, wherein the UL feedback message comprises a Physical Random Access Channel (PRACH) signal.

Example 12 may include the method of any of Examples 8-11, wherein the reference signal is one of a path-loss (PL) reference signal and a spatial reference signal.

Example 13 may include the method of any of Examples 8-12, wherein the AP CSI-RS information indicates the beam pattern associated to the reference signal by indicating that the reference signal is quasi co-located (QCLed) with a further downlink (DL) reference signal.

Example 14 may include a method comprising determining or causing to determine a beam pattern; selecting or causing to select a downlink (DL) reference signal that is associated with the beam pattern and triggers configuration of the DL reference signal by sending a downlink control information (DCI) to a UE, wherein the DCI contains triggering information of UE to transmit an uplink (UL) reference signal.

Example 15 may include a method comprising determining or causing to determine a beam pattern; determining or causing to determine a downlink (DL) reference signal based on the beam pattern; and generating or causing to generate a downlink control information (DCI), wherein the DCI includes the DL reference signal and triggering information to trigger a UE to transmit an uplink (UL) reference signal.

Example 16 may include the method of any of Examples 14 and 15, or some other Example herein, wherein the DL reference signal is aperiodic (AP) CSI-RS, the DCI is carried by PDCCH, and the UL reference signal is an AP SRS.

Example 17 may include the method of any of Examples 14-16, or some other Example herein, further comprising transmitting or causing to transmit the DCI to the UE.

Example 18 may include the method of any of Examples 14-16, or some other Example herein, further comprising monitoring or causing to monitor reception of a SRS, wherein the SRS is corresponding to the UL reference signal.

Example 19 may include the method of Example 18, or some other Example herein, wherein the SRS is corresponding to the AP SRS triggered by the DCI.

Example 20 may include the method of any of Examples 18 and 19, or some other Example herein, further comprising: receiving or causing to receive the SRS; determining or causing to determine that the received SRS is corresponding to the AP SRS; and determining or causing to determine a setting of spatial domain RX filter based on the beam pattern.

Example 21 may include the method of Example 20, or some other Example herein, wherein the determination of the setting of spatial domain RX filter is to update the setting of spatial domain RX filter.

Example 22 may include the method of any of Examples 18 and 19, or some other Example herein, further comprising: receiving or causing to receive the SRS; determining or causing to determine the received SRS is not corresponding to the AP SRS; and abandoning or causing to abandon updating a setting of spatial domain RX filter.

Example 23 may include the method of any one of Examples 14 or 15, or some other Example herein, further comprising: configuring or causing to configure an AP CSI-RS for a target UL channel.

Example 24 may include the method of Example 16 or some other Example herein, further comprising: configuring or causing to configure an AP CSI-RS for the PUCCH.

Example 25 may include the method of Example 24 or some other Example herein, wherein the configuration is via RRC.

Example 26 may include the method of Example 24 or some other Example herein, wherein the AP CSI-RS is a spatial RS or a path loss RS.

Example 27 includes the method of any of Examples 14-26, and/or some other Examples herein, wherein the method is performed by a next-generation NodeB (gNB) or a portion thereof.

Example 28 may include a method comprising: extracting or causing to extract a downlink control information (DCI) upon decoding a corresponding PDCCH; determining or causing to determine a TX beam pattern based on received beam information of the triggered AP CSI-RS, updating or causing to update a spatial domain TX filter based on the determined TX beam pattern; and transmitting or causing to transmit an UL feedback signal to a base station, wherein the UL feedback signal includes an AP SRS.

Example 29 may include a method comprising: decoding or causing to decode a downlink control information (DCI) based on a received PDCCH; determining or causing to determine a TX beam pattern based on the decoded DCI; determining or causing to determine a spatial domain TX filter based on the determined TX beam pattern; and transmitting or causing to transmit an UL feedback signal to indicate a feedback AP SRS.

Example 30 may include the method of any one of Examples 28 and 29, or some other Example herein, wherein the DCI includes or indicates a DL reference signal and a UL RS.

Example 31 may include the method of Example 30 or some other Example herein, wherein the DL reference signal includes an AP CSI-RS and the UL RS includes a triggering AP SRS.

Example 32 may include the method of any one of Examples 27-31, or some other Example herein, wherein the UL feedback signal is the same as or corresponding to the triggering AP SRS included in the DCI.

Example 33 may include the method of any one of Examples 28-31 or some other Example herein, wherein the feedback AP SRS is the same as or corresponding to the triggering AP SRS included in the DCI.

Example 34 may include the method of any of Examples 28-33, or some other Example herein, wherein the UL feedback signal is a PRACH signal, whose preamble sequence is associated with the AP CSI-RS.

Example 35 may include the method of Example 34, or some other Example herein, wherein the association between the AP CSI-RS and the PRACH could be pre-configured by a base station to a UE via higher layer messages or RRC.

Example 36 may include the method of any of Examples 28-31, or some other Example herein, wherein the UL feedback signal includes one or more feedback bits carried by an uplink control information (UCI) in an upcoming PUCCH.

Example 37 may include the method of Example 36, or some other Example herein, wherein the upcoming PUCCH is a most recent upcoming PUCCH.

Example 38 may include the method of any one of Examples 28-31, or some other Example herein, further comprising updating or causing to update quasi co-location (QCL) or spatial relation information for corresponding downlink/uplink signal which is related to the AP CSI-RS in slot n+K, where the UL feedback signal is transmitted in slot n.

Example 39 may include the method of Example 38, or some other Example herein, wherein the slot n indicates a slot including either the first or last symbol of the UL feedback signal, if there are more than one the UP feedback signal or the UP signal takes multiple slots.

Example 40 may include the method of Example 38, or some other Example herein, wherein value of K can be predefined or configured by higher layer signaling.

Example 41 may include the method of Example 38, or some other Example herein, wherein value of K is determined by a subcarrier spacing of bandwidth of the PDCCH and/or that of the bandwidth of the scheduled uplink signal.

Example 42 includes the method of any one of Examples 14-26, and/or some other Examples herein, wherein the method is performed by a UE or a portion thereof.

Example 43 may include an apparatus comprising means to perform one or more elements of a method described in or related to any of the above Examples, or any other method or process described herein.

Example 44 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 45 may include an apparatus comprising logic, modules, or circuitry to perform one or more elements of a method described in or related to any of the above Examples, or any other method or process described herein.

Example 46 may include a method, technique, or process as described in or related to any of the above Examples, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 48 may include a signal as described in or related to any of the above Examples, or portions or parts thereof.

Example 49 may include a datagram, packet, frame, segment, protocol data unit (PDU), or message as described in or related to any of the above Examples, or portions or parts thereof, or otherwise described in the present disclosure.

Example 50 may include a signal encoded with data as described in or related to any of the above Examples, or portions or parts thereof, or otherwise described in the present disclosure.

Example 51 may include a signal encoded with a datagram, packet, frame, segment, PDU, or message as described in or related to any of the above Examples, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 53 may include a computer program comprising instructions, wherein execution of the program by a processing element is to cause the processing element to carry out the method, techniques, or process as described in or related to any of the above Examples, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method of a user equipment (UE), comprising:
   decoding Downlink Control Information (DCI) of a Physical Downlink Control Channel (PDCCH) to generate decoded DCI;
   extracting aperiodic Channel-State Information Reference Signal (AP CSI-RS) information from the decoded DCI;
   updating a beam configuration of a reference signal based on the AP CSI-RS information by:
      determining a transmit (TX) beam pattern based on the AP CSI-RS information; and
      determining a spatial domain TX filter based on the determined TX beam pattern; and
   generating an uplink (UL) feedback message indicating that the PDCCH was successfully decoded by the UE.

2. The method of claim 1, further comprising extracting aperiodic sounding reference signal (AP SRS) information from the decoded DCI; and wherein the UL feedback message comprises a triggered AP SRS based on the AP SRS information.

3. The method of claim 2, wherein the triggered AP SRS is spatially associated with the reference signal.

4. The method of claim 1, wherein the UL feedback message comprises a Physical Random Access Channel (PRACH) signal.

5. The method of claim 1, wherein the beam configuration of the reference signal is updated based on an indication in the AP CSI-RS infoiniation that the reference signal is quasi co-located (QCLed) with a further downlink (DL) reference signal.

6. The method of claim 1, wherein the reference signal is one of a path-loss (PL) reference signal and a spatial reference signal.

7. A computing apparatus of a user equipment (UE), the computing apparatus comprising:
   a processor; and
   a memory storing instructions that, when executed by the processor, configure the computing apparatus to:
      decode Downlink Control Information (DCI) of a Physical Downlink Control Channel (PDCCH) to generate decoded DCI;
      extract aperiodic Channel-State Information Reference Signal (AP CSI-RS) information from the decoded DCI;
      update a beam configuration of a reference signal based on the AP CSI-RS information by:
         determining a transmit (TX) beam pattern based on the AP CSI-RS information; and
         determining a spatial domain TX filter based on the determined TX beam pattern; and
      generate an uplink (UL) feedback message indicating that the PDCCH was successfully decoded by the UE.

8. The computing apparatus of claim 7, the memory further storing instructions that, when executed by the processor, configure the computing apparatus to extract aperiodic sounding reference signal (AP SRS) information from the decoded DCI; and wherein the UL feedback message comprises a triggered AP SRS based on the AP SRS information.

9. The computing apparatus of claim 8, wherein the triggered AP SRS is spatially associated with the reference signal.

10. The computing apparatus of claim 7, wherein the UL feedback message comprises a Physical Random Access Channel (PRACH) signal.

11. The computing apparatus of claim 7, wherein the beam configuration of the reference signal is updated based on an indication in the AP CSI-RS information that the reference signal is quasi co-located (QCLed) with a further downlink (DL) reference signal.

12. The computing apparatus of claim 7, wherein the reference signal is one of a path-loss (PL) reference signal and a spatial reference signal.

* * * * *